Sept. 20, 1932.   P. S. LEGGE   1,878,415
TOOL FOR CUTTING STONE
Filed Oct. 30, 1928
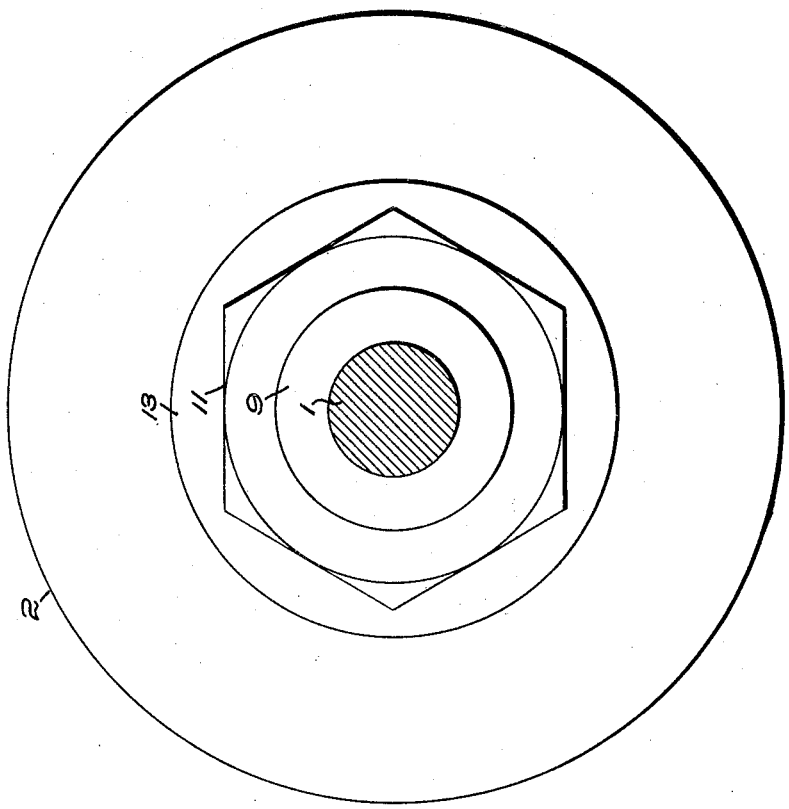
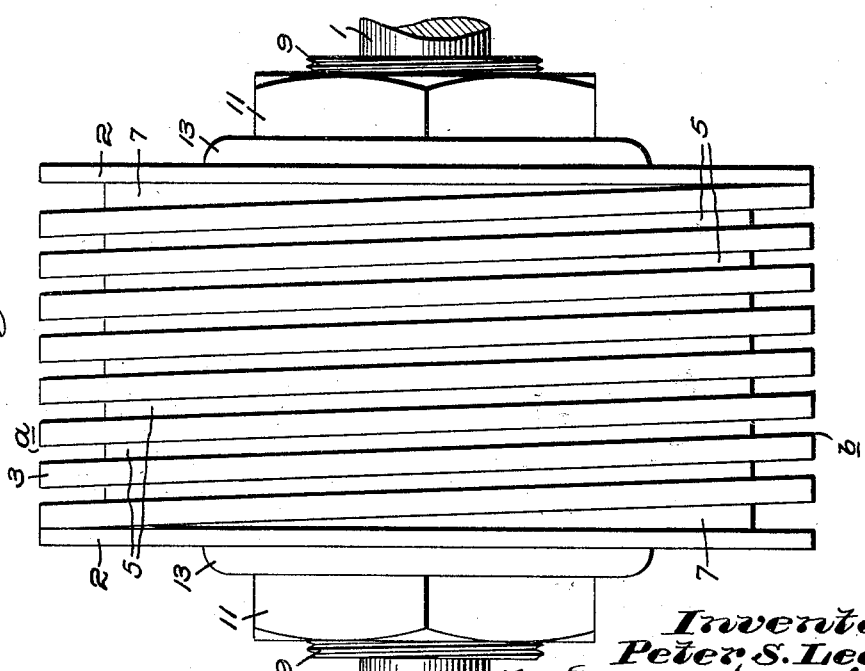
Inventor:
Peter S. Legge, Patented Sept. 20, 1932

1,878,415

UNITED STATES PATENT OFFICE

PETER S. LEGGE, OF POMPTON LAKES, NEW JERSEY

TOOL FOR CUTTING STONE

Application filed October 30, 1928. Serial No. 316,073.

The invention relates to tools for cutting and surfacing material such as stone and will be best understood from the following description when read in the light of the accompanying drawing of one specific embodiment of the invention, while the scope of the invention will be more particularly pointed out in the appended claims.

In the drawing:—

Fig. 1 is a side elevation of a tool constructed according to the invention; and Fig. 2 is an end view of a tool constructed according to Fig. 1.

Heretofore it has been common practice to cut or saw stone by the use of a narrow flat disc which is revolved and has its periphery presented to the stone, water and abrasive, the latter in the form of chilled shot, being used to facilitate the cutting operation. It has been found that the bottom of the saw cut when carrying out this process, due to the action of the shot, is approximately semicircular in profile, the diameter of the semicircle being approximately that of the thickness of the saw disc.

According to the present invention the tool, as it revolves, continuously acts upon different portions of the surface of the stone by reason of the peculiar shape and disposition of the cutting elements with the result that the tool can be used for surfacing and will form a smooth continuous surface at the bottom of the cut.

Referring to the drawing, a shaft or spindle 1 driven in any suitable manner has mounted thereon a pair of end discs 2, between which are positioned a plurality of inclined discs 3. The discs 3 are spaced by means of inclined washers 5 while between the end discs 2 and the adjacent inclined discs are tapered washers 7. Conveniently the discs 2 and 3 and washers 5 and 7 are placed upon a sleeve 9 secured in any suitable manner in non-rotatable relation to the shaft and are clamped together by nuts 11 screw-threaded upon the sleeve 9 and acting upon collars 13 which bear against the end discs 2.

Conveniently the inclination of the discs 3 is such that the upper corners $a$ of the discs line up with or overlap the lower corners $b$ of adjacent discs so that a smooth cut will be formed when the tool is rotated and presented to the stone and chilled shot and water are fed to the cut.

It will be understood that within the scope of the invention wide deviations may be made from the embodiment thereof herein submitted without departing from the spirit of the invention.

I claim:

1. A rotary tool of the type having a power driven arbor for sinking recesses in stone by use of abrasive fed to the cut having, in combination, a plurality of spaced, coaxially arranged, radially projecting members formed with band-like peripheral surfaces inclined to the axis of the tool and conforming to a surface of revolution coaxial with said axis, and means for forming a side corner of said recess operative to cut a slot in the stone at right angles to the tool axis intersecting that surface of the recess which is operated upon by said band-like surfaces, said means comprising a saw-like member the diameter of which is not less than that of the adjacent band-like surface.

2. A rotary tool of the type having a power driven arbor for sinking recesses in stone by use of abrasive fed to the cut having, in combination, a plurality of spaced, coaxially arranged, radially projecting members formed with band-like peripheral surfaces inclined to the axis of the tool and conforming to a surface of revolution coaxial with said axis, and means for forming a side corner of said recess operative to cut a slot in the stone at right angles to the tool axis intersecting that surface of the recess which is operated upon by said band-like surfaces, said means comprising a saw-like member with which an edge of the adjacent band-like surface contacts.

In testimony whereof, I have signed my name to this specification.

PETER S. LEGGE.